United States Patent [19]

Küfner, deceased et al.

[11] Patent Number: 5,362,159
[45] Date of Patent: Nov. 8, 1994

[54] BEARING SEAL

[75] Inventors: Walter Küfner, deceased, late of Schweinfurt, by Emilie Küfner, legal representative; Lothar Meidl, Schweinfurt, both of Germany

[73] Assignee: SKF GmbH, Schweinfurt, Germany

[21] Appl. No.: 24,620

[22] Filed: Mar. 1, 1993

[30] Foreign Application Priority Data

Mar. 4, 1992 [DE] Germany .............................. 4206764

[51] Int. Cl.⁵ .............................................. F16C 33/78
[52] U.S. Cl. .................... 384/484; 384/486; 384/571; 384/569
[58] Field of Search ............... 384/484, 486, 571, 569, 384/564, 489

[56] References Cited

U.S. PATENT DOCUMENTS

| | | | |
|---|---|---|---|
| 4,798,482 | 1/1989 | Kruk | 384/571 |
| 5,058,262 | 10/1991 | Brockmüller et al. | 384/571 |
| 5,292,199 | 3/1994 | Hosbach et al. | 384/486 |

FOREIGN PATENT DOCUMENTS 3615343 11/1986 Germany .

*Primary Examiner*—Lenard A. Footland
*Attorney, Agent, or Firm*—Rosen, Dainow & Jacobs

[57] ABSTRACT

A sealed four-row tapered roller bearing, useable for working rolls of roll stands, is provided with axial multipart inner and outer races and tapered rollers arranged between the bearing races, sealing of the seat of the outer race parts in the housing being preferably effected by O-rings which are arranged in annular grooves of the outer race parts. The bearing chamber is sealed axially outward by sealing rings which are fastened in annular grooves in the bore of the outer race parts and rest with sealing lips on surfaces of the inner race, the separating line between the front faces of the inner races being sealed off by a sealing ring which rests on the inner races. The bearing chamber of the four-row tapered roller bearing is protected against the penetration of dirt and the tapered roller bearing can easily be assembled and disassembled as a result of the bore of the sealing ring being provided with continuous ribs which delimit at least one chamber for receiving lubricant, the sealing ring being arranged and centered on preferably cylindrical surfaces of inner race prolongations facing one another.

8 Claims, 2 Drawing Sheets

5,362,159

BEARING SEAL

BACKGROUND OF THE INVENTION

The present invention concerns a sealed four-row tapered roller bearing, in particular for working rolls of roll stands, having axial multipart inner and outer races and tapered rollers arranged between the bearing races.

DESCRIPTION OF THE PRIOR ART

Sealed four-row tapered roller bearings of this type are disclosed for example, in German Letters of Disclosure DE-OS 3,615,343. In this known roller bearing the separating line between the inner races is sealed off by a sealing ring, which is arranged in the center of the bearing in a recess open radially to the roll journal. When the bearing is slipped on the journal of the working roll, the sealing ring can easily be damaged if the seating is slightly tilted in the recess.

The object of the present invention is to provide a sealed four-row tapered roller bearing of the construction described above which can be easily assembled and disassembled and in which the interior of the bearing is better protected against dirt.

BRIEF DESCRIPTION OF THE INVENTION

According to the present invention, this object is accomplished in that a sealing ring of, for example, synthetic material is provided with continuous ribs in the bore which delimit at least one chamber for holding lubricant. The sealing ring is arranged and centered on preferably cylindrical surfaces of inner race prolongations facing one another. This design allows a good seal of the bearing against the journal of the roll by virtue of a simple mechanism that can be inexpensively produced.

According to another feature of the invention, an O-ring is provided in annular grooves arranged on the face of the outer outer race parts. Good sealing of the bearing against the insert piece is thereby likewise obtained, and even with repeated insertion and removal of the bearing the sealing rings remain undamaged, so that the lubricant is held in the bearing and no dirt can get into the bearing.

Additional advantages and embodiments of the tapered roller bearing according to the invention are described in the following more detailed description and appended claims.

DETAILED DESCRIPTION OF THE INVENTION

Figure 1:
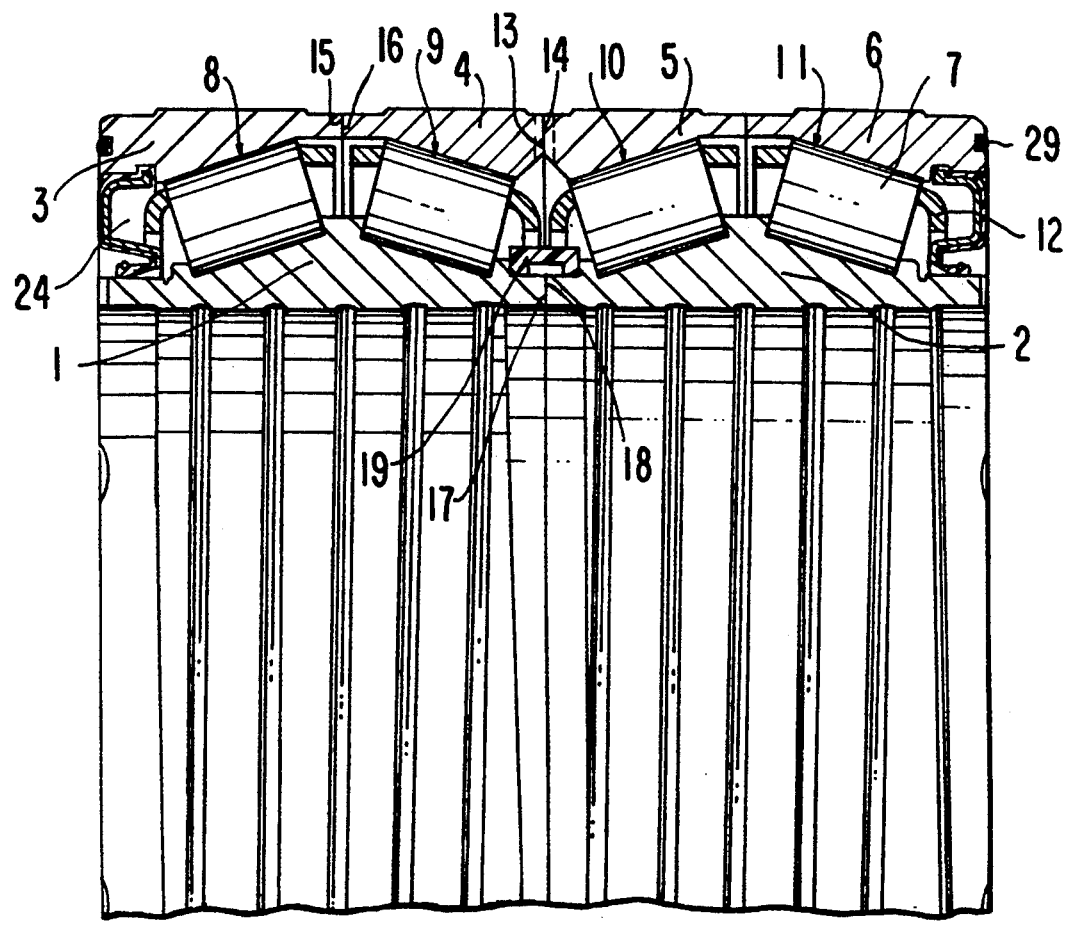
FIG. 1 shows a sealed four-row tapered roller bearing according to the invention, in section.
Figure 2:
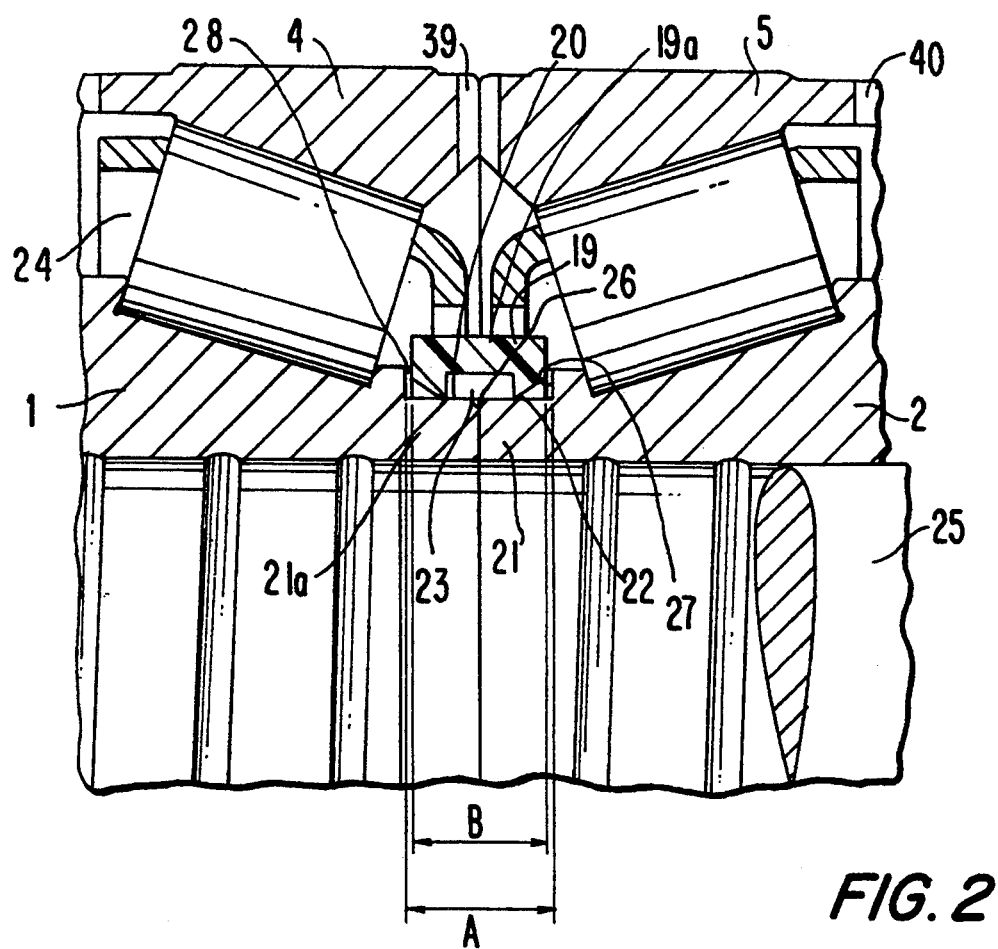
FIG. 2 illustrates the center section of the tapered roller bearing represented in FIG. 1, on an enlarged scale.
Figure 3:
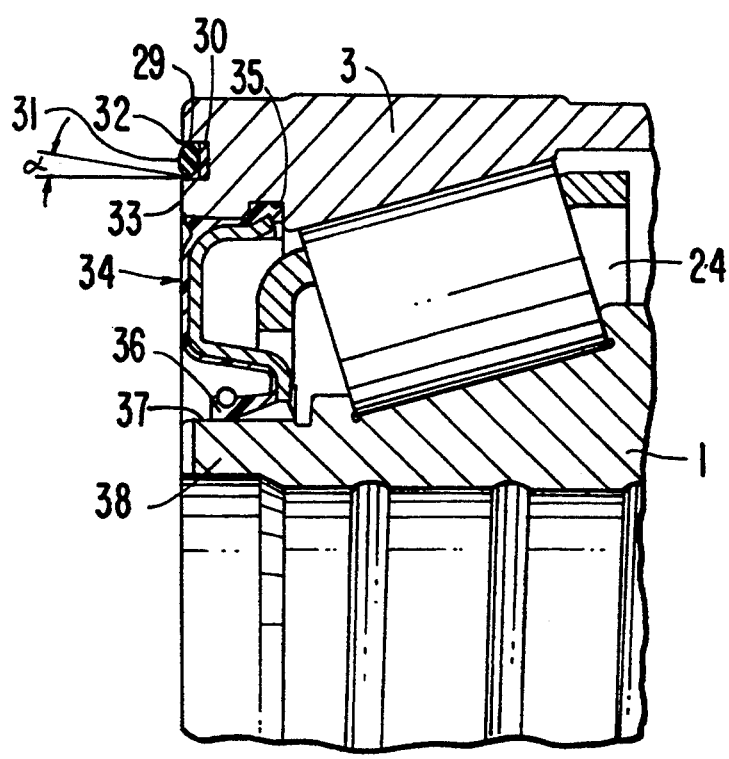
FIG. 3 shows an outer section of the tapered roller bearing represented in FIG. 1, on an enlarged scale.

A four-row tapered roller bearing, which is typically used as a working roller bearing for roll stands, mainly for hot and cold band mills, is represented in FIGS. 1 to 3. The tapered roller bearing according to the invention consists of two inner race parts 1, 2, four outer race parts, 3, 4, 5, 6 and the tapered rollers 7. The tapered rollers 7 of each row 8, 9, 10, 11 of rollers are held and guided in a cage 12 and are arranged between the tracks of the inner races 1, 2 and those of the outer races 3, 4, 5, 6. The faces 13, 14 of the inner outer race parts 4, 5, facing one another, lie directly on one another, while the faces 15 of the inner outer race parts 4, 5, facing one another, are arranged directly on the faces 16 of the outer outer race parts 3, 6. The faces 17, 18 of the inner races 1, 2, facing one another, likewise lie directly on one another. Sealing of the separating line between the faces 17, 18 of the inner races 1, 2 is effected by a sealing ring 19 of, for example, synthetic material, which is arranged and centered in the center of the bearing on cylindrical surfaces 20 of inner-race prolongations 21, 21a. The bore of the sealing ring 19 is provided with continuous ribs 22, which lie on the axially directed cylindrical surfaces 20 of the inner races 1, 2 and, with the inner races 1, 2, form closed chambers 23 for holding lubricant, so that the bearing chamber 24 is securely sealed off from the journal 25 of the roll. Any scuff from the journal 25 of the roll or from the inner race faces 17, 18 can be received and collected in these chambers 23. The sealing ring 19 is provided with an integrated closure ring 19a of, for example, metal. The prolongations 21, 21a of the inner races have bevels 26 on the sides facing one another, so that on assembly of the bearing the sealing ring 19 can be slipped onto one inner race prolongation 21 and centered there and the inner race prolongations 21a of the other inner race 1 can then be inserted into the bore of the sealing ring 19 without difficulties. The clear distance apart A of the radially directed surfaces 27 which, with the cylindrical surfaces 20, form an annular groove 28 open radially toward the outside, is designed slightly greater than the width B of the sealing ring 19, so that the latter, upon assembly of the bearing, cannot be deformed and the axial bearing air is not affected. The outer race parts 3, 4, 5, 6 are arranged in the bore of an insert piece (not shown), while sealing of the seat of the outer outer race parts 3, 6 is effected in the insert piece by O-rings 29, which are inserted in annular grooves 30 arranged on the face, secured against falling out by the side faces 31, 32. For this, at least one side face 31 of the annular groove 30, starting from the front face 33, runs at an angle α to the axis of the bearing and the inside diameter of the O-ring 29 is designed smaller than the greatest diameter of the side face 31 of the annular groove 30, so that the O-ring 29 is elastically deformed upon insertion into the annular groove 30 and snaps into the annular groove 30. The bearing chamber 24 is sealed off axially toward the outside by sealing rings 34, which are arranged in annular grooves 35 in the bore of the outer outer race parts 3, 6 and rest with the sealing lips 36 on cylindrical surfaces 37 of inner race prolongations 38. For relubrication and for ventilation of the bearing, the outer race parts 4, 5 are provided with corresponding openings 39, 40.

The invention is not limited to the example illustrated. Modifications in design of the individual components are possible as a matter of course within the scope of the invention. Thus, the sealing ring 19 may alternatively be made of two individual rings, one or more projections being provided on, for example, the face of the one ring, which engage in or snap into one or more recesses on the face of the other ring.

We claim:

1. A sealed roller bearing comprising inner and outer races and rollers arranged between the bearing races, the separating line between the faces of the inner races being sealed off by a sealing ring which rests on the inner races, said facing inner races being provided with prolongations extending towards each other, said sealing ring having a plurality of continuous ribs defining at least one chamber for holding lubricant, said ring being arranged and centered on surfaces of said inner race prolongations facing one another.

2. The bearing according to claim 1, wherein the inner-race prolongations are provided with bevels on the sides facing one another.

3. The bearing according to claim 2 wherein the inner-race prolongations have radially and axially directed surfaces, the radially directed surfaces of the inner-race prolongations forming, with the axially directed faces, an annular groove open radially outward for receiving said sealing ring.

4. The bearing according to claim 3, wherein the clear distance apart of the radially directed surfaces is designed to be slightly greater than the width of the sealing ring.

5. The bearing according to claim 1, wherein annular grooves are provided on the front face of the outer race and an O-ring is provided in said annular grooves.

6. The bearing according to claim 5, wherein at least one side face of said annular groove is inclined at an angle $\alpha$ to the bearing axis and the inside diameter of said O-ring is smaller than the greatest diameter of said side face.

7. The bearing according to claim 1 wherein the sealing ring is provided with an integrated closure ring mounted along one surface thereof.

8. A sealed four-row tapered roller bearing, in particular for working rolls of roll stands, comprising axial multipart inner and outer races and tapered rollers arranged between the bearing races, wherein sealing of the seat of the outer race parts in the housing is effected by O-rings which are arranged in annular grooves of the outer race parts, the bearing chamber being sealed axially toward the outside by sealing rings which are fastened in annular grooves in the bore of the outer race parts and rest with sealing lips on surfaces of the inner race, the separating line between the faces of the inner races being sealed off by a sealing ring which rests on the inner races, said sealing ring having continuous ribs in the bore which define at least one chamber for holding lubricant, arranged and centered on cylindrical surfaces of inner race prolongations facing one another.

* * * * *